UNITED STATES PATENT OFFICE.

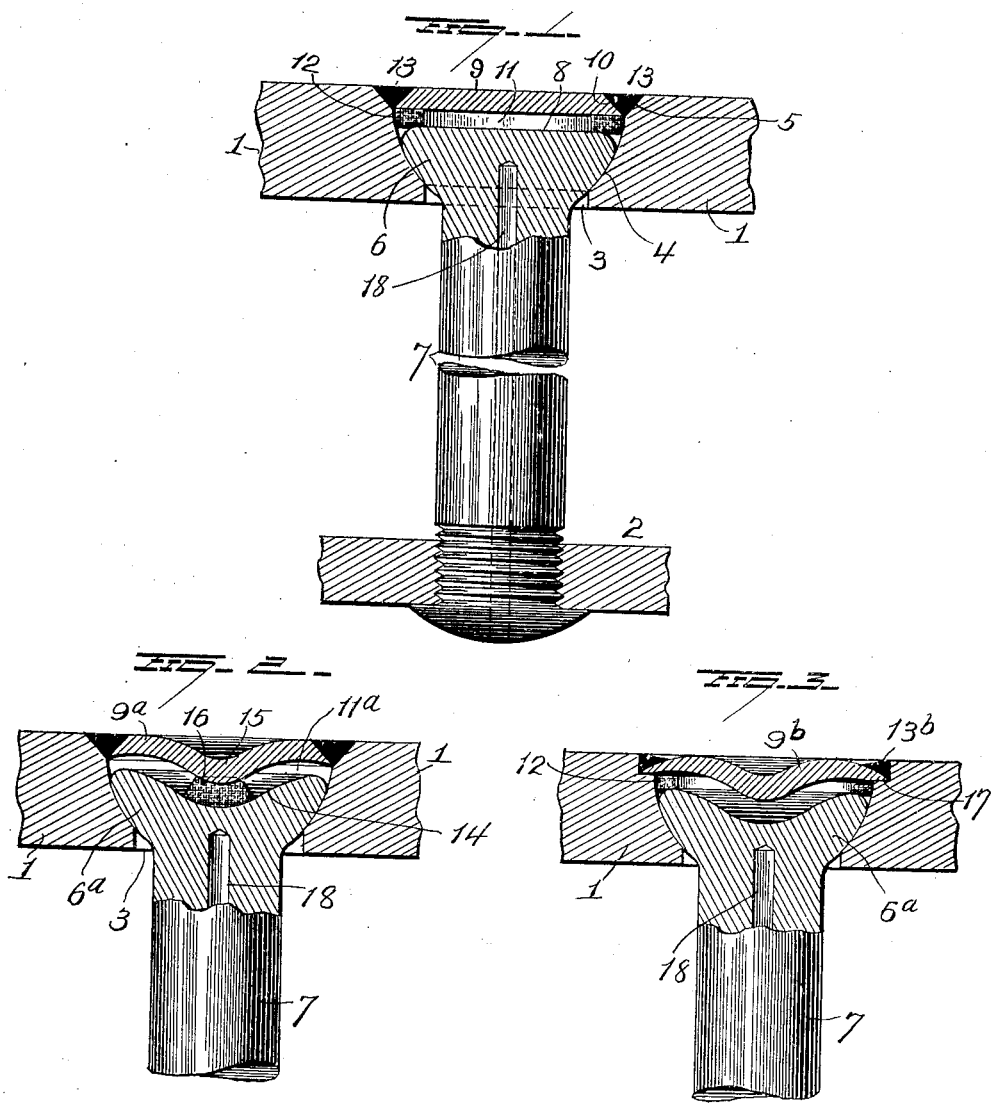
J. R. FLANNERY AND E. I. DODDS.
STAYBOLT STRUCTURE.
APPLICATION FILED SEPT. 10, 1919.
1,354,612.
Patented Oct. 5, 1920.

JOHN ROGERS FLANNERY AND ETHAN I. DODDS, OF PITTSBURGH, PENNSYLVANIA, ASSIGNORS TO FLANNERY BOLT COMPANY, OF PITTSBURGH, PENNSYLVANIA.

STAYBOLT STRUCTURE.

1,354,612. Specification of Letters Patent. Patented Oct. 5, 1920.

Application filed September 10, 1919. Serial No. 322,872.

*To all whom it may concern:*

Be it known that we, JOHN ROGERS FLANNERY and ETHAN I. DODDS, citizens of the United States, and residents of Pittsburgh, in the county of Allegheny and State of Pennsylvania, have invented certain new and useful Improvements in Staybolt Structures; and we do hereby declare the following to be a full, clear, and exact description of the invention, such as will enable others skilled in the art to which it appertains to make and use the same.

This invention relates to improvements in staybolt structures for boilers, and more particularly to those of the "flush" type,—one object of the invention being to provide simple and efficient means whereby a closure of disk form shall be supported in the bolt opening and properly spaced from the bolt head while the edge portion of the closure is being welded to the boiler sheet.

A further object is to provide a temporary destructible member between the closure and the bolt head, which will serve to prevent the welding alloy from reaching the coöperating bearing faces of the bolt head and wall of the opening in the boiler sheet.

With these and other objects in view, the invention consists in certain novel features of construction and combinations of parts as hereinafter set forth and pointed out in the claims.

In the accompanying drawings; Figure 1 is a sectional view, partly in elevation, showing an embodiment of our invention, and Figs. 2 and 3 are views illustrating other embodiments of the invention.

1 represents an outer boiler sheet and 2 the inner sheet of a boiler. The outer boiler sheet is made with an opening 3, a portion of the wall of which is made rounded transversely of the sheet to form a rounded seat 4, and the outer end portion of the wall of the opening in the boiler sheet may be made flaring as indicated at 5. The head 6 of a staybolt 7 is made with a rounded portion movably mounted on the rounded portion 4 of the wall of the opening in the boiler sheet and the inner end of the staybolt may be secured to the inner boiler sheet in any suitable manner.

In the embodiment of the invention shown in Fig. 1, the bolt head is made with a flat or straight outer end as indicated at 8, and the opening in the boiler sheet is closed over the bolt head by means of a closure 9 made in the form of a disk, the peripheral portion of which is beveled as indicated at 10.

In order that suitable clearance (as indicated at 11) shall be provided for the head of the staybolt, it is necessary that the closure shall be properly spaced from the flattened portion 8 of said head, and it is desirable that the closure shall be flush with the outer face of the outer boiler sheet. For temporarily supporting the closure in such position while its peripheral portion is being welded to the boiler sheet, a ring 12 of destructible material, such as paper, is interposed between the closure and the bolt head. The peripheral or edge portion of the closure is united to the boiler sheet by a weld 13,—the welding alloy occupying the annular groove formed by the beveled face 5 in the boiler sheet and the beveled face 9 at the edge of the closure. The destructible ring also serves as a temporary packing to prevent the welding alloy from reaching the bearing faces of the bolt head and its seat in the boiler sheet during the welding operation.

In the embodiment of the invention shown in Figs. 2 and 3, the head 6ª of the staybolt is made with a depression 14 and the closure 9ᵇ is made with a corresponding depression 15, thus forming a clearance space 11ª having curved upper and lower walls which will tend to facilitate the displacing and loosening of the sediment by the endwise movements and vibration of the bolt, and preventing said sediment from becoming caked and hardened in the clearance space.

In the construction shown in Fig. 2, a destructible supporting member 16 for the closure is located centrally between the depressed portions of the bolt head and closure.

In Fig. 3, a counterbore is made in the boiler sheet whereby an annular shoulder 17 is formed and on which the closure 9ᵇ is mounted. In this construction, the weld 13ᵇ is located between the straight wall of the counterbore and the closure and over the edge portion of the latter,—the closure 9ᵇ shown in Fig. 3 having its edge portion comparatively thin and its upper face curved. When the construction shown in Fig. 3 is employed, the destructible member 12 will serve as a packing to prevent welding alloy from reaching the bearing faces of the bolt head and its seat.

As the opening in the boiler sheet is permanently sealed by the welded closure, it is desirable for testing purposes, that the staybolt shall be provided with a tell-tale hole 18 extending from the inner end thereof and terminating within the headed end.

Having fully described our invention, what we claim as new and desire to secure by Letters-Patent, is:—

1. In a staybolt structure, the combination with a boiler sheet having an opening and a staybolt having a head mounted in said opening, of a closure for said opening disposed over the bolt head, a temporary member of material destructible by steam or water, between the bolt head and closure, and a weld uniting the edge portion of the closure to the boiler sheet.

2. In a staybolt structure, the combination with a boiler sheet having an opening, and a staybolt having a head mounted in said opening, of a closure closing said opening over the bolt head, no part of which closure projects beyond the outer face of the boiler sheet, a temporary member of material destructible by steam or water, between said closure and bolt head, and a weld uniting the edge portion of the closure to the boiler sheet.

3. In a staybolt structure, the combination with a boiler sheet having an opening, and a staybolt having a head mounted in said opening, of a closure in said opening, a temporary support of material destructible by steam or water for said closure disposed between the same and the bolt head, and a weld uniting the edge portion of the closure to the boiler sheet.

4. In a staybolt structure, the combination with a boiler sheet having an opening, and a staybolt having a head mounted in said opening, a portion of the outer wall of the opening being beveled, of a closure for said opening over the bolt head, said closure having a beveled edge, a temporary member of material destructible by steam or water, between said closure and the bolt head, and a weld between the beveled edge of the closure and the beveled portion of the wall of the opening and uniting said closure to the boiler sheet.

5. In a staybolt structure, the combination with a boiler sheet having an opening, of a staybolt having a head mounted in said opening, said head having a depression, a closure in said opening and having a depression, the depressions of the bolt head and the closure forming a clearance space having curved oppositely disposed walls, a weld uniting the edge portion of the closure to the boiler sheet, and means for supporting the closure while it is being welded.

In testimony whereof we have signed this specification in the presence of two subscribing witnesses.

JOHN ROGERS FLANNERY
ETHAN I. DODDS.

Witnesses:
JAMES R. HORAN,
EDWIN S. RYCE.